United States Patent
Ehm et al.

(10) Patent No.: US 10,424,819 B2
(45) Date of Patent: Sep. 24, 2019

(54) SEMICONDUCTOR BATTERY AND SEMICONDUCTOR DEVICE INCLUDING A SEMICONDUCTOR BATTERY

(71) Applicant: Infineon Technologies Dresden GmbH & Co. KG, Dresden (DE)

(72) Inventors: Hans Ehm, Pullach (DE); Ludwig Heitzer, Falkenfels (DE); Marko Lemke, Dresden (DE); Claudius Von Petersdorff-Campen, Munich (DE)

(73) Assignee: Infineon Technologies Dresden GmbH & Co. KG, Dresden (DE)

( * ) Notice: Subject to any disclaimer, the term of this patent is extended or adjusted under 35 U.S.C. 154(b) by 239 days.

(21) Appl. No.: 15/463,265

(22) Filed: Mar. 20, 2017

(65) Prior Publication Data

US 2017/0271722 A1    Sep. 21, 2017

(30) Foreign Application Priority Data

Mar. 21, 2016   (DE) .................. 10 2016 105 219

(51) Int. Cl.

| | | |
|---|---|---|
| *H01M 10/42* | (2006.01) | |
| *H01M 2/02* | (2006.01) | |
| *H01M 4/38* | (2006.01) | |
| *H01M 4/525* | (2010.01) | |
| *H01M 6/18* | (2006.01) | |
| *H01M 10/0562* | (2010.01) | |

(Continued)

(52) U.S. Cl.
CPC ......... *H01M 10/425* (2013.01); *H01M 2/026* (2013.01); *H01M 2/0277* (2013.01); *H01M 4/386* (2013.01); *H01M 4/525* (2013.01); *H01M 6/186* (2013.01); *H01M 6/5044* (2013.01); *H01M 10/0562* (2013.01); *H01M 10/486* (2013.01); *H01M 2220/30* (2013.01); *H01M 2300/0068* (2013.01)

(58) Field of Classification Search
CPC .... H01M 10/425; H01M 2/026; H01M 4/386; H01M 4/525; H01M 6/186; H01M 6/5044; H01M 10/0562; H01M 10/486
See application file for complete search history.

(56) References Cited

U.S. PATENT DOCUMENTS

| | | |
|---|---|---|
| 2013/0084476 A1 | 4/2013 | Ellis-Monaghan et al. |
| 2014/0178728 A1 | 6/2014 | Nalamasu et al. |
| 2015/0280198 A1 | 10/2015 | Lemke et al. |

(Continued)

FOREIGN PATENT DOCUMENTS

| | | |
|---|---|---|
| CN | 104953167 A | 9/2015 |
| DE | 112010000945 T5 | 9/2012 |
| KR | 20140098808 A | 8/2014 |

*Primary Examiner* — Helen Oi K Conley
(74) *Attorney, Agent, or Firm* — Murphy, Bilak & Homiller, PLLC

(57) ABSTRACT

A semiconductor battery includes a substrate, a battery anode semiconductor material arranged in or over the substrate, a battery cathode material arranged in or over the substrate and a battery electrolyte disposed between the battery anode semiconductor material and the battery cathode material. An electrically insulating encapsulant has a first face and a second face. The substrate is at least partly embedded in the encapsulant. An anode electrode is electrically connected to the battery anode semiconductor material and is disposed over the second face of the encapsulant. A cathode electrode is electrically connected to the battery cathode material and is disposed over the first face of the encapsulant.

13 Claims, 6 Drawing Sheets

(51) Int. Cl.
*H01M 6/50* (2006.01)
*H01M 10/48* (2006.01)

(56) References Cited

U.S. PATENT DOCUMENTS

2015/0280284 A1 10/2015 Shakespeare et al.
2015/0325862 A1 11/2015 Song et al.

SEMICONDUCTOR BATTERY AND SEMICONDUCTOR DEVICE INCLUDING A SEMICONDUCTOR BATTERY

TECHNICAL FIELD

This disclosure relates in general to the technique of semiconductor batteries and semiconductor devices including a semiconductor battery and a semiconductor component.

BACKGROUND

Batteries of limited size are largely used in a multitude of different applications such as, e.g., mobile devices, watches, remote controls, calculators, etc. It is desirable to provide small low cost batteries with fast charging and inexpensive manufacturing processes.

SUMMARY

A semiconductor battery comprises a substrate and a battery anode semiconductor material arranged in or over the substrate. A battery cathode material arranged in or over the substrate and a battery electrolyte is disposed between the battery anode material and the battery cathode material. An electrically insulating encapsulant has a first face and a second face. The substrate is at least partly embedded in the encapsulant. An anode electrode is disposed over the second face of the encapsulant. The anode electrode is electrically connected to the battery anode material. A cathode electrode is disposed over the first face of the encapsulant. The cathode electrode is electrically connected to the cathode battery material.

A semiconductor device comprises a substrate and a battery anode semiconductor material arranged in or over the substrate. A battery cathode material is arranged in or over the substrate and a battery electrolyte is disposed between the battery anode material and the battery cathode material. An electronic component is separated from die substrate and is electrically connected to the battery anode semiconductor material and to the battery cathode material. The semiconductor device further comprises an electrically insulating encapsulant. The substrate and the electronic component are at least partly embedded in the encapsulant.

A semiconductor battery wafer comprises a semiconductor wafer having a first face and a second face opposite the first face. An array of first holes is arranged in the first face of the semiconductor wafer. Each first hole accommodates at least a part of a battery cathode material and at least a part of a battery electrolyte.

A method of manufacturing a semiconductor battery comprises forming an array of semiconductor battery structures in or on a wafer. The wafer is separated into single substrates each comprising at least one semiconductor battery structure. The substrates are placed in a spaced-apart relationship onto a carrier. The substrates are encapsulated in an electrically insulating material to form an encapsulation body. The encapsulation body comprises a first surface facing away from the carrier and a second surface opposite the first surface. A first electrical layer is formed over the first surface of the encapsulation body. The encapsulation body is singularized into single semiconductor batteries.

A method of manufacturing a semiconductor device comprises forming an array of semiconductor battery structures in or on a wafer. The wafer is separated into single substrates each comprising at least one semiconductor battery structure. The substrates are placed in a spaced-apart relationship onto a carrier. The electronic components are placed onto the carrier. The substrates and the electronic components are encapsulated in an electrically insulating material to form an encapsulation body. An electrical layer is formed on the first surface of the encapsulation body. The encapsulation body is singularized into single semiconductor devices each including at least one semiconductor battery structure and one electronic component.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
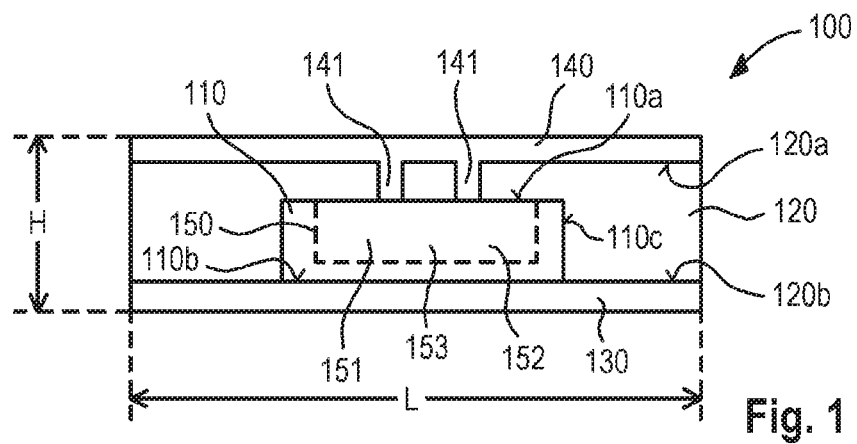
FIG. 1 is a cross-sectional view illustrating an exemplary semiconductor battery in accordance with one or more embodiments.

In the following detailed description, reference is made to the accompanying drawings, which form a part thereof, and in which is shown by way of illustration specific embodiments in which the invention may be practiced. In this regard, directional terminology, such as "top", "bottom", "front", "back", "upper", "lower", etc., is used with reference to the orientation of the Figure(s) being described.

Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other unless specifically noted otherwise.

Further, as employed in this specification, the terms "bonded", "attached", "connected", "coupled" and/or "electrically connected/electrically coupled" are not meant to mean that the elements or layers must directly be contacted together; intervening elements or layers may be provided between the "bonded", "attached", "connected", "coupled" and/or "electrically connected/electrically coupled" elements, respectively. However, in accordance with the disclosure, the above-mentioned terms may, optionally, also have the specific meaning that the elements or layers are directly contacted together, i.e. that no intervening elements or layers are provided between the "bonded", "attached", "connected", "coupled" and/or "electrically connected/electrically coupled" elements, respectively.

Further, the word "over" used with regard to a part, element or material layer formed or located "over" a surface may be used herein to mean that the part, element or material layer be located (e.g. placed, formed, deposited, etc.) "directly on", e.g. in direct contact with, the implied surface. The word "over" used with regard to a part, element or material layer formed or located "over" a surface may be used herein to mean that the part, element or material layer be located (e.g. placed, formed, deposited, etc.) "indirectly on" the implied surface with one or more additional parts, elements or layers being arranged between the implied surface and the part, element or material layer. The same applies analogously to the terms "under", "below", "beneath", etc.

The substrates described herein may be of various materials, among them crystalline, polycrystalline or amorphous materials. By way of example, the substrates may be of a semiconductor material, such as, e.g., silicon or of an electrically insulating material such as, e.g., glass.

The battery anode semiconductor material may include or may consist of at least one material of the following group of materials, the group including: silicon, doped silicon, a material compound including silicon.

The semiconductor battery cathode material may include or consist of at least one material of the following group of materials, the group including: lithium, cobalt, nickel, aluminum, oxygen, iron, phosphorus, manganese, vanadium, manganese spinel, lithium nickel manganese cobalt, lithium iron phosphate (doped or undoped), olivine, $LiCoO_2$) $LiNiO_2$, $LiNi_{i-x}$, $Co_xO_2$, $LiNi_{0.85}Co_{0.1}Al_{0.05}O_2$, $LiNi_{0.33}Cu_{0.33}Mn_{0.33}O_2$, $LiMn_2O_4$ (spinel structure), $LiFePO_4$, $V_2O_5$, $LiMn_2O_4$, $LiFePO_4$, stainless steel, and any other possible material to form a cathode or a cathode layer.

A battery electrolyte is disposed between the battery anode material and the battery cathode material. The battery electrolyte material may include or consist of lithium, phosphorus, lithium phosphorus, oxynitride, a polymer, $LiPF_6$, $LiBF_4$, poly-oxyethylene, Thio-Liscon, $LiPO_{1-x}N_{1-y}$ (Li-PON), LISICON materials and NASICON materials and any other possible material to form a layer of battery electrolyte.

An electrically insulating encapsulant may be used to at least partly encapsulate the substrate and, e.g., one or more electronic component (s), if present. The encapsulant may include or consist of a thermoset material or a thermoplastic material. A thermoset material may, e.g., be made on the basis of an epoxy resin, a silicone resin or an acrylic resin. A thermoplastic material may, e.g., include one or more materials selected from the group of polyetherimide (PET), polyether-sulfone (PES), polyphenylene-sulfide (PPS), polyamide-imide (PAI), and polyethylene-terephthalate (PET). Thermoplastic materials melt by application of pressure and heat during molding or lamination and (reversibly) harden upon cooling and pressure release.

The encapsulant may include or consist of a polymer material, e.g. a duroplastic polymer material. The encapsulant may include or consist of at least one of a filled or unfilled mold material, a filled or unfilled thermoplastic material, a filled or unfilled thermoset material, a filled or unfilled laminate, a fiber-reinforced laminate, a fiber-reinforced polymer laminate, and a fiber reinforced polymer laminate with filler particles.

The encapsulant may be applied over the substrate and, e.g., the electronic component (s) by, e.g., molding or laminating.

In the first case, i.e. if the encapsulant is a mold material, various techniques such as, e.g., compression molding, injection molding, powder molding, liquid molding, or film-assisted molding (FAM) may be used to form an encapsulant or an encapsulation body (e.g. artificial wafer) containing a plurality of encapsulants. The mold material may be applied to overmold the substrate (s) and, e.g., the electronic component (s) if present.

In the second case, i.e. if the encapsulant is made of a laminate material, the encapsulant may have the shape of a piece of a layer, e.g. a piece of an electrically insulating foil or sheet that is laminated over the substrate (s) and, e.g., the electronic component (s), if present. Heat and pressure may be applied for a time suitable to attach the piece of a foil or sheet to the underlying structure. During lamination, the electrically insulating foil or sheet is capable of flowing (i.e. is in a plastic state), resulting in that gaps between the substrate (s) and, e.g., the electronic component (s) or other topological structures are filled with the polymer material of the electrically insulating foil or sheet. The electrically insulating foil or sheet may include or consist of any appropriate thermoplastic or thermoset material. In various embodiments, the insulating foil or sheet may include or consist of a prepreg (short for pre-impregnated fibers), that is, e.g., made of a combination of a fiber mat, for example glass or carbon fibers, and a resin, for example a thermoset or thermoplastic material. Prepreg materials are typically used to manufacture PCBs (printed circuit boards).

The electronic component (s), if present, may each be a semiconductor chip. This or these semiconductor chip(s) may be of different types, may be manufactured by different technologies and may include, for example, integrated circuits, e.g., monolithic integrated electrical, electro-optical or electro-mechanical circuits. More specifically, a semiconductor chip may, e.g., include one or more of a sensor circuit, a logic integrated circuit, an analogue integrated circuit, a mixed signal integrated circuit, and a memory circuit.

The semiconductor chip(s) referred to above may be manufactured from specific semiconductor material such as, for example, Si, SiC, SiGe, GaAs, GaN, AlGaN, InGaAs, InAlAs, etc., and, furthermore, may contain inorganic and/or organic materials that are not semiconductors.

The semiconductor chip(s) referred to above may include control circuits, microprocessors, memory circuits and/or micro-electromechanical components. They may, e.g., include sensors or detectors (such as, e.g., a temperature sensor/detector, a magnetic field sensor/detector, an electrical field sensor/detector, a mechanical force sensor/detector, an acceleration sensor/detector, a pressure sensor/detector, a microphone, an optical sensor/detector).

The electronic component(s), if present, may each be designed as a passive or an active component. By way of example, if designed as a passive component, the electronic component may be a so-called PID (passive integrated device). A PID may implement one or more of a capacitance, an inductance and a resistance.

If designed as an active component, the electronic component may be any of the kind of semiconductor chips as described above, in particular sensor/detector and/or logical chips. If multiple electronic components are involved, it is possible that at least one active component and at least one passive component are included in the encapsulant.

The semiconductor batteries or semiconductor devices may be fabricated by an eWLP (embedded Wafer Level Packaging) process. In this case, substrates and, e.g., electronic components, if present, are placed in a spaced-apart relationship on a carrier. An insulating material is then applied over the carrier, the substrates and, e.g., the electronic components to form an encapsulation body (also referred to as an artificial wafer). Hence, the artificial wafer may include a high number of substrates and, e.g., electronic components. The artificial wafer is then divided into the single semiconductor batteries or the single semiconductor devices each being packaged by the encapsulant.

A semiconductor battery may be a so-called button cell. Button cells are small single cell batteries shaped as a button. Button cells are widely used in multitude of different applications, e.g. calculators, watches, hearing aids, remote controls toys, LED lights, backup batteries, real time batteries, displays, laser pointers, mini flashlights, music greeting cards, alarm systems, computers (e.g. bicycle computer), blood sugar indicators, car keys, car stereo, electronic databases, medical applications, timers, insulin pumps, medial applications, and thermometers. In one or more embodiments, the semiconductor battery, e.g. a button cell, comprises a substrate (processed to include a semiconductor battery structure) embedded in the encapsulant, but no electronic component. In other embodiments, the semiconductor battery, e.g. a button cell, additionally comprises an electronic component, e.g., a PID, a microcontroller IC or a thermometer sensor IC, which is also embedded in the encapsulant. The electronic component provides at least one additional functionality to the "battery functionality" of the semiconductor battery. In this case, the substrate including the semiconductor battery structure may additionally act as an internal power supply for energizing the electronic component. By way of example, the semiconductor battery may be a "smart battery".

A semiconductor device according to the disclosure comprises a substrate including a semiconductor battery structure and at least one electronic component, wherein both are embedded in the encapsulant. The electronic component provides a functionality of the semiconductor device. The semiconductor battery structure may act as an internal power supply for energizing the electronic component. By way of example, the semiconductor device may be any semiconductor device equipped with an internal semiconductor battery structure, i.e. a sensor/detector, microcontroller, etc.

FIG. 1 illustrates a semiconductor battery 100 in accordance with various embodiments. The semiconductor battery 100 includes a substrate 110. The substrate 110 is at least partly embedded in an electrically insulating encapsulant 120. The encapsulant 120 has a first face 120a and a second face 120b opposite the first face 120a. The semiconductor battery 100 further comprises a cathode electrode 140 disposed over the first face 120a of the encapsulant 120 and an anode electrode 130 disposed over the second face 120b of the encapsulant 120.

The substrate 110 may he associated with a semiconductor battery structure 150. According to various embodiments, the semiconductor battery structure 150 may be monolithically integrated in the substrate 110 as illustrated in FIG. 1 by way of example. In other embodiments the semiconductor battery structure 150 may be arranged over the substrate 110.

The semiconductor battery structure 150 includes a battery anode semiconductor material 151 in or over the substrate 110, a battery cathode material 152 in or over the substrate 110 and a battery electrolyte 153 disposed between the battery anode semiconductor material 151 and the battery cathode material 152. A specific arrangement of the battery anode semiconductor material 151, the battery cathode material 152 and the battery electrolyte 153 is not depicted in FIG. 1, as a multitude of different designs for implementing the semiconductor battery structure 150 is available. For example, horizontal multi-layer structures or vertical trench-like structures for arranging the battery anode semiconductor material 151, the battery cathode material 152 and the battery electrolyte 153 between the battery anode semiconductor material 151 and the battery cathode material 152 are feasible.

The term "semiconductor battery" as used throughout this disclosure has the meaning that the battery anode material 151 is a semiconductor material. By way of example, the battery anode semiconductor material 151 may include or consist of silicon, doped silicon, or a material compound including silicon. The silicon may be crystalline, polycrystalline or amorphous. In all these cases the semiconductor battery is a silicon battery.

According various embodiments, the battery anode semiconductor material 151 is formed by the intrinsic material of the substrate 110. In other words, the substrate 110 may include or consist of silicon, e.g. crystalline, polycrystalline or amorphous silicon. Specifically, the substrate 110 may be a silicon die or silicon chip, e.g. a silicon die or silicon chip as diced out of a wafer.

Further, the semiconductor battery structure 150 may have the characteristic that it is configured to be fabricated by using conventional chip production process steps. As such, the battery anode semiconductor material 151 may be generated and processed (e.g. deposited, structured, doped, etc.) during conventional semiconductor processing, the battery cathode material 152 may be generated and processed (e.g. deposited, structured, doped, etc.) during conventional semiconductor processing and the battery electrolyte 153 may be generated and processed (e.g. deposited, structured, doped) during conventional semiconductor processing. Semiconductor processing deposition techniques may include chemical vapor deposition (CVD) or physical vapor deposition (PVD).

CVD processing may, e.g., include low pressure CVD (LPCVD) or ultrahigh vacuum, CVD (UHVCVD) and plasma-enhanced CVD (PECVD). CVD processes may in particular be used to deposit silicon, polysilicon, amorphous silicon, silicon-dioxide, silicon nitride, etc. PVD processing may include a variety of sputtering, evaporation or epitaxy processes such as, e.g. ion-beam sputtering (IBS), reactive sputtering, vacuum evaporation or molecular beam epitaxy (MBE).

Further, the generation of the semiconductor battery structure 150 may include patterning processes for removing selected portions of material, e.g. substrate material, battery anode semiconductor material 151, battery cathode material 152 and/or battery electrolyte 153. Patterning processes may include one or more of a masking process, a lithographic process, and an etching process. For example, a photoresist may be applied, the photoresist may be exposed to a pattern of light, the photoresist may be developed, the developed (or undeveloped) photoresist may be removed and the underlying material exposed by the removed photoresist may be etched.

As illustrated in FIG. 1, a second face 110b of the substrate 110 may level with the second face 120b of the encapsulant 120. The anode electrode 130 may be disposed both over the second face 120b of the encapsulant and over the second face 110b of the substrate 110. The anode electrode 130 may be a continuous conducting layer which may cover equal to or more than 50%, 60%, 70%, 80%, 90%, 95%, or equal to 100% (i.e. the entire) of the footprint area (area of combined second face 110b and second face 120b) of the semiconductor battery 100.

Similarly the cathode electrode 140 may be a continuous conducting layer which may cover equal to or more than 50%, 60%, 70%, 80%, 90%, 95% or equal to 100% (i.e. the entire) of the top surface (e.g. the first face 120a of the encapsulant 120) of the semiconductor battery 100.

The cathode electrode 140 may be connected by a first electrical interconnect 141 to the battery cathode material 152 in or over the substrate 110. The first electrical interconnect 141 may be formed by vias (electrical through-connections) extending between the cathode electrode 140 and the battery cathode material 152. As such, the encapsulant 120 may completely cover the (upper) first face 110a of the substrate 110, and the first electrical interconnect 141 may pass through the encapsulant 120 arranged over the first face 110a of the substrate 110 to connect to battery cathode material 152. Further, a part or all of the side faces 110c of the substrate 110 may be partly or completely covered by encapsulant 120.

The anode electrode 130 and the cathode electrode 140 may each be formed by a metallization layer which may include or consist of at least one material of the following group of materials, the group including: a metal, a metal alloy, a transition metal, platinum, copper, aluminum, gold, titanium, vanadium, molybdenum, tantalum, nickel, steel, etc.

The shape of the semiconductor battery 100 or, more specifically, its dimensions (lateral dimension L, height H) may comply with pertinent battery specifications of various button cells as stipulated in standard literature. In other words, the semiconductor battery 100 may be used as a button cell in a variety of applications such as, e.g., mentioned above.

In accordance with various embodiments, the semiconductor battery 100 may therefore be denoted as an eWLP (embedded wafer level packaging) semiconductor battery or an eWLP semiconductor button cell. As mentioned above, the term "semiconductor battery" relates to the semiconductor material of the battery anode 151, silicon. The term "semiconductor battery" may in addition relate to the fact that the substrate 110 and the semiconductor battery structure 150 may be manufactured by conventional semiconductor processing steps. The term "eWLP" (embedded wafer level packaging) relates to the technique of packaging the substrate 110. eWLP may include generating an artificial wafer composed of an array of substrates 110 embedded in a panel of (still integral) encapsulants 120 (this artificial wafer or panel is also referred to as a encapsulation body), applying metallization layers on both sides of the artificial wafer for generating the anode electrode 130 and the cathode electrode 140 of the semiconductor battery 100, and singulating the artificial wafer into single semiconductor batteries 100 as illustrated in FIG. 1.

The semiconductor battery 100 may form a solid state electrolyte battery, i.e. a solid state battery wherein the battery electrodes (i.e. battery anode 151 and battery cathode 152) are provided by solid state materials and the battery electrolyte is a solid state material as well. The semiconductor battery 100 may be a primary or a secondary battery, i.e. the semiconductor battery 100 may be a non-rechargeable battery or a rechargeable battery, respectively. The semiconductor battery 100 (and all examples of batteries described in this disclosure) may be a small low cost battery with an inexpensive manufacturing process, high discharge currents and, e.g., fast charging.

Figure 2:
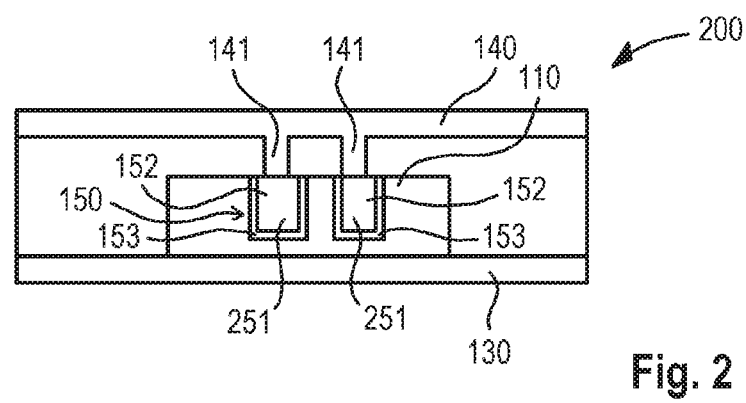
FIG. 2 is a cross-sectional view illustrating an exemplary semiconductor battery in accordance with one or more embodiments.

According to FIG. 2, a semiconductor battery 200 may comprise a substrate 110 including or consisting of a semiconductor material, e.g. silicon or any other of the semiconductor materials mentioned above, which simultaneously is the semiconductor material of the battery anode 151. FIG. 2 illustrates a specific example of the semiconductor battery structure 150. The semiconductor battery structure 150 may comprise an array of first holes 251 provided in the first face 110a of the substrate 110. For ease of illustration, only a number of two first holes 251 are depicted, while in practice a number of several hundreds or thousands first holes 251 may be provided. Each first hole 251 may accommodate at least a part of the battery cathode material 152 and at least a part of the battery electrolyte 153. The battery anode semiconductor material 151 may be provided by the inner walls of the first holes 251, i.e. by the material of the substrate 110.

As illustrated in FIG. 2, the battery electrolyte 153 may separate the battery anode semiconductor material 151 and the battery cathode material 152. More specifically, the inner walls of the first holes 251 may be completely covered by a layer of battery electrolyte 153. A space defined by the inner walls of the battery electrolyte 153 may then be partly or completely filled with battery cathode material 152. The battery cathode material 152 within each first hole 251 may then be electrically connected to the cathode electrode 140 by the first electrical interconnect 141, which may be formed by an array of vias. Each via may be associated with one first hole 251. Alternatively, as will be explained in more detail further below, the first face 110a of the substrate 110 may be provided with an internal redistribution structure (not shown) configured for electrically interconnecting the battery cathode material 152 hole-by-hole. In this case, the number of vias of the first electrical interconnect 141 may be smaller than the number of first holes 251 and may, e.g., even be as small as 1.

It is to be noted that the semiconductor battery 200 may be understood to be a specific example of the semiconductor battery 100. Therefore, the disclosure in relation to semiconductor battery 100 also applies to semiconductor battery 200, and vice versa.

Figure 3:
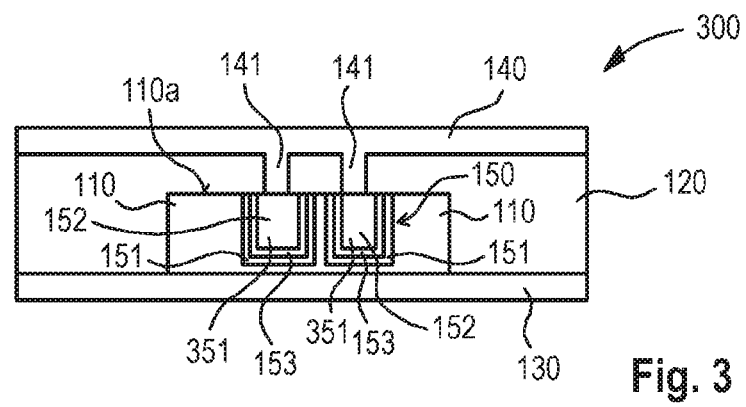
FIG. 3 is a cross-sectional view illustrating an exemplary semiconductor battery in accordance with one or more embodiments.

According to FIG. 3, a semiconductor battery 300 may be provided with a substrate 110 of an insulating material, e.g. a material comprising or consisting of glass. The first face 110a of the substrate 110 may be provided with an array of first holes 351 similar to the array of first holes 251 as described in conjunction with FIG. 2. The first holes 351 accommodate at least a part of the battery cathode material 152, at least a part of the battery electrolyte 153 and at least a part of the battery anode semiconductor material 151. That is, in the example of FIG. 3, the battery anode semiconductor material 151 is provided as a first layer partly or completely covering the inner walls of the first holes 351. That way, the first holes 351 are provided with a semiconductor wall material which may be the same material as the wall material of the first holes 251 in semiconductor battery 200. The residual arrangement of the semiconductor battery structure 150 of the semiconductor battery 300 is similar to the semiconductor battery structure 150 of semiconductor battery 200. That is, the first holes 351 coated with the battery anode semiconductor material 115 are provided with a layer of battery electrolyte 153 and the inner space, defined by the layer of battery electrolyte 153, may be partly or completely filled with battery cathode material 152.

Further, while in the semiconductor battery 200 the battery anode semiconductor material 151 may be directly electrically connected to the anode electrode 130 of the semiconductor 200 via the substrate 110 (which may provide for the battery anode semiconductor material 151), in the semiconductor battery 300 an internal second electrical interconnect (not shown) such as, e.g., an internal wiring of the semiconductor substrate 110 may be used to interconnect the battery anode semiconductor material 151 to the anode electrode 130, since the substrate 110 of the semiconductor battery 300 may consist of an electrically insulating material. Thus, according to various embodiments, an internal wiring is provided in the substrate 110 of the semiconductor battery 300 to electrically interconnect the battery anode semiconductor material 151 to the anode electrode 130. Alternatively, the first holes 351 may be designed as through-holes which completely pass through the substrate 110 so as to expose the anode electrode 130 at their bottom. The battery anode semiconductor material 151 may then be applied as a layer to cover the side walls and the exposed areas of the anode electrode 130 at the bottoms of the first holes 351. The electrical connection between the battery anode semiconductor material 151 and the anode electrode 130 is then established by the direct contact of the battery anode semiconductor material layer 151 with the anode electrode 130 at the bottoms of the first holes 351.

Except that the battery anode semiconductor material 151 is a layer covering the inner walls of the first holes 351 and that it is electrically connected by, e.g., an internal wiring to the anode electrode (see above), all characteristics of semiconductor battery 300 may be equal or similar to the corresponding characteristics of semiconductor batteries 200 and 100, and reference is made to the above disclosure to avoid reiteration. As to FIGS. 2 and 3, the arrangement of a (first) hole 251, 351 which accommodates the battery electrolyte 153 and the battery cathode material 152 can be considered as a (basic) battery element of the semiconductor battery structure 150 in or on the semiconductor substrate 110. However, it is to be noted that this is only one of a plurality of possibilities of how to design such a (basic) battery element, and that battery element designs different from the "hole-concept" as illustrated in FIGS. 2 and 3 are possible.

Generally, silicon button cell batteries such as example semiconductor batteries 100, 200, 300 may be provided with the unique feature of a high C-rate. The C-rate is the ratio of the discharging current and the battery capacity. C-rates of, e.g., 0.5-100 1/h may be obtained. These high C-rates allow for high discharge currents. Discharging currents equal to or greater than 20, 30, 40 or 50 A/cm$^3$ could be achieved. These high C-rates compare to C-rates of $\ll$ 1/h with existing button cell battery technologies.

A gravimetric energy density of equal to or greater than 50, 70, 90, 110, 130, 150 mAh/g and a volumetric energy density of equal to or greater than 300, 350, 400, 450, 500, 550, 600 mAh/cm$^3$ may be possible. The gravimetric energy density may be higher by a factor of, e.g. 2 compared with existing technologies. The volumetric energy density may also be higher by a factor of, e.g. 2 compared with existing technologies.

Further, the semiconductor batteries 100, 200, 300 allow for small package volume, and hence a large ratio of active volume to total package volume may be obtained. If the volume of the substrate 110 is taken as the active volume and the volume of the semiconductor battery as defined by the shape of the semiconductor battery 100, 200, 300 (i.e. including the volume of the encapsulant 120 and the battery electrodes 130, 140) is taken as the total package volume, a ratio of equal to or greater than 50%, 60%, 70%, 80%, 90% may be obtained.

Figure 4:
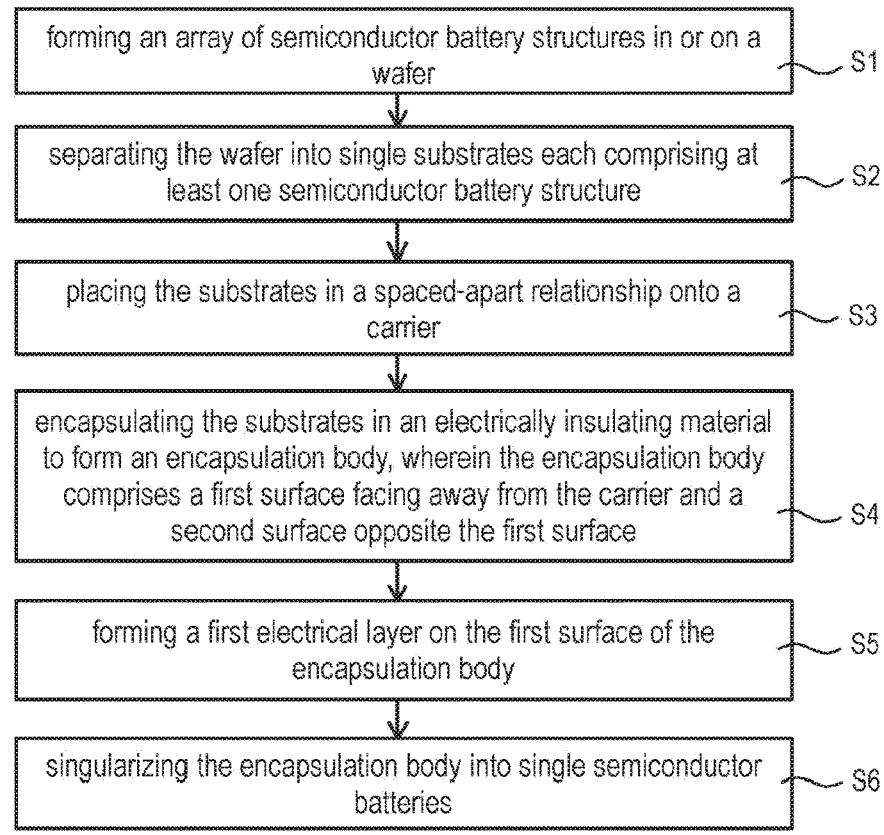
FIG. 4 is a flow-chart of an exemplary method of manufacturing a semiconductor battery in accordance with one or more embodiments.

FIG. 4 illustrates a flow-chart of an exemplary process of manufacturing a semiconductor battery 100, 200, 300. At S1 an array of semiconductor battery structures is formed in or on a wafer. As described above, various different semiconductor battery structures 150 may be used.

At S2 the wafer is separated into single substrates each comprising at least one semiconductor battery structure. Examples of substrates 110 and semiconductor battery structures 150 have been describe in conjunction with FIGS. 1-3.

At S3 the substrates are placed in a spaced-apart relationship onto a carrier. As will be explained in more detail below, the carrier may be a temporary carrier (which is removed later in the manufacturing process) or may be a permanent carrier (which, e.g., provides for an electrode of the semiconductor battery).

At S4 the substrates are encapsulated in an electrically insulating material to form an encapsulation body, wherein the encapsulation body comprises a first surface facing away from the carrier and a second surface opposite the first surface.

At S5 a first electrical layer is formed on the first surface of the encapsulation body. The first electrical layer may, e.g., provide for the cathode electrode 140. The first electrical layer may, e.g., also provide for the first electrical interconnect 141.

At S6 the encapsulation body is singularized into single semiconductor batteries such as, e.g., semiconductor batteries 100, 200, 300. The singularization of the encapsulation body may thus provide for the encapsulants 120 of each semiconductor battery 100, 200, 300.

According to various embodiments, forming an array of semiconductor battery structures in or on a wafer may further comprise generating a plurality of first arrays of first holes in a first surface of the wafer, wherein the inner walls of the first holes comprise a battery anode semiconductor material. It is to be noted that the wafer may either be semiconductor wafer (e.g. a silicon wafer) or may be a wafer of another material (e.g. a glass wafer) with the inner walls of the first holes coated with the battery anode semiconductor material as described before in conjunction with FIG. 3

The forming of an array of semiconductor battery structures may further comprise introducing a battery electrolyte material into the first holes and forming a battery cathode material over the battery electrolyte material.

As will be explained in more detail further below, the forming of an array of semiconductor battery structures may be a process which may comprise processing the wafer on both main faces. That is, the process may further comprise generating a plurality of second arrays of second holes in a second surface of the wafer opposite the first surface of the wafer. Similar to the first holes, the inner walls of the second holes may comprise the battery anode semiconductor material.

Still similar to the processing of the first surface of the wafer, electrolyte material may then be introduced into the second holes, and battery cathode material may be formed over the battery electrolyte material.

The process of encapsulating the substrates in an electrically insulating material may be performed in various different ways. By way of example, encapsulating the substrates in the electrically insulating material may comprise molding. According to another possibility, the process of encapsulating the substrates in an electrically insulating material may comprise laminating.

Figure 5A:
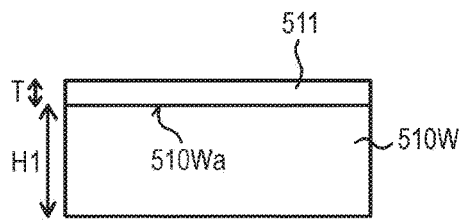
FIGS. 5A-5S are cross-sectional views illustrating an exemplary semiconductor battery during manufacture in accordance with one or more embodiments.
Figure 5B:
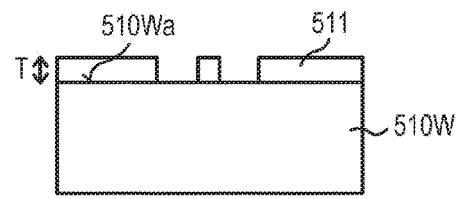
Figure 5C:
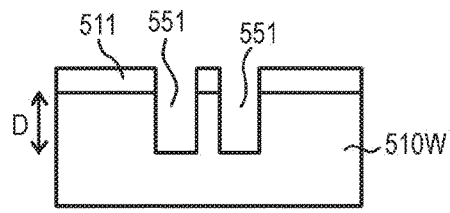
Figure 5D:
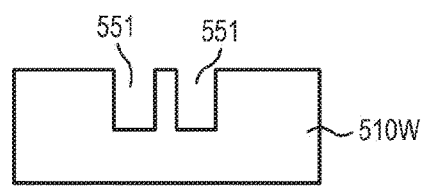
Figure 5E:
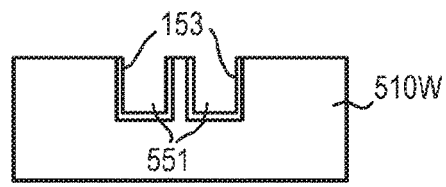
Figure 5F:
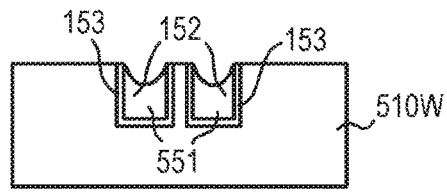
Figure 5G:
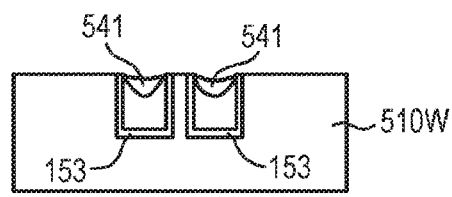
Figure 5H:
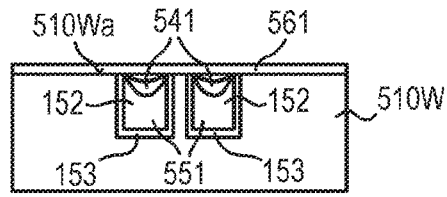
Figure 5I:
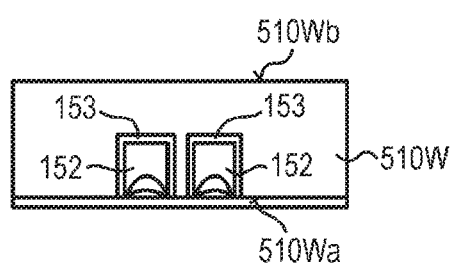
Figure 5J:
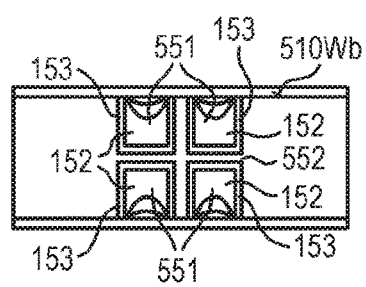
Figure 5K:
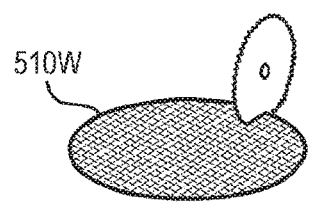
Figure 5L:
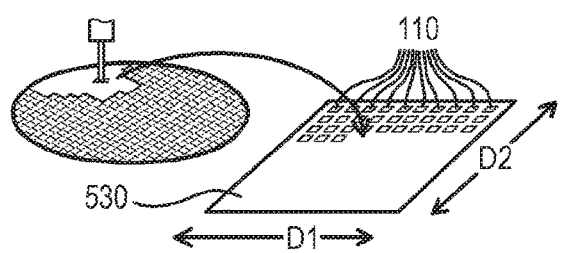
Figure 5M:
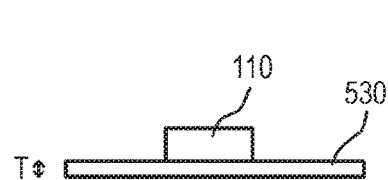
Figure 5N:
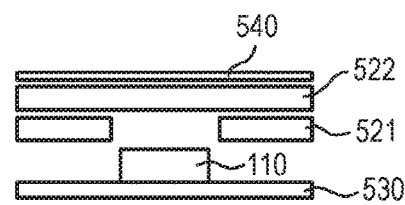
Figure 5O:
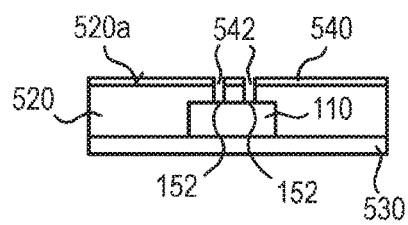
Figure 5P:
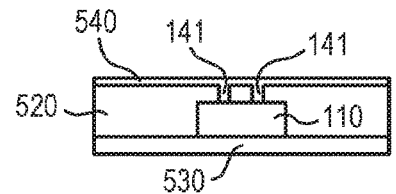
Figure 5Q:
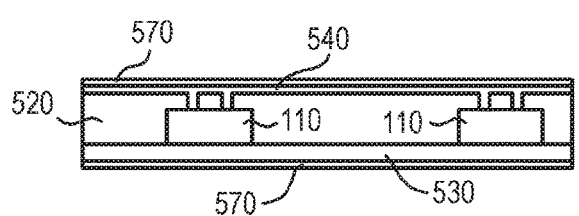
Figure 5R:
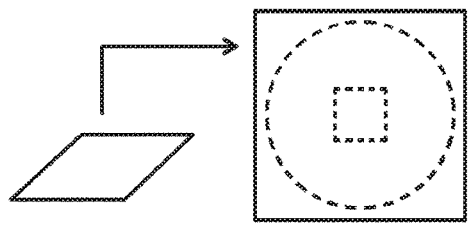
Figure 5S:
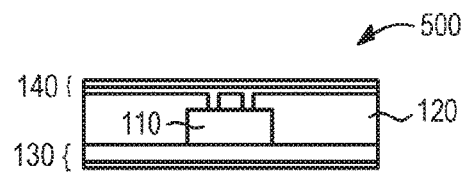

FIGS. 5A-5S illustrate cross-sectional views of a semiconductor battery such as, e.g., semiconductor batteries 100, 200, 300 during manufacture in accordance with various embodiments. According to FIG. 5A, a wafer 510W may be provided. The wafer 510W may, e.g., be a silicon wafer, e.g. a 12" silicon wafer. The wafer 510W may have a thickness H1 of equal to or greater than or less than 400 µm, 500 µm, 600 µm, 700 µm, 800 µm, 900 µm, 1000 µm, 1100 µm, 1200 µm.

A mask layer 511 such as, e.g., a photoresist may then be applied on a first face 510Wa of the wafer 510W. The mask layer 511 may have a thickness T equal to or greater than or less than 20 µm, 30 µm, 40 µm, 50 µm, 60 µm. The application of the mask layer 511 may be accomplished during front-end wafer processing. The wafer 510W may spin during the application of the mask layer 511 to achieve a thin and even mask layer 511.

According to FIG. 5B, the mask layer 511 is structured. Structuring of the mask layer 511 may be done by exposing the mask layer (e.g. photoresist) 511 by ultraviolet light. Then either the exposed or the unexposed areas of the mask layer 511 are removed by dissolving. FIG. 5B illustrates by way of simplification the generation of only two areas in which the mask layer 511 is removed. In practice typically a much larger number of openings in the mask layer 511 will be produced, e.g. equal to or more than a few thousand per substrate area. By way of example, equal to or more than 50%, 60%, 70%, 80%, 90%, 95% of the total per substrate area of the mask layer 511 may be removed. In other words, a rather dense array of openings may be produced.

According to FIG. 5C, holes or trenches 551 may be then be formed in the wafer 510W in alignment with the openings. The holes 551 may correspond with the first holes 251 of FIG. 2 or the first holes 351 of FIG. 3. The holes 551 may have a depth D equal to or greater than or less than 200 µm, 300 µm, 400 µm, 500 µm. If only the first face 510Wa of the wafer is to be processed, the depth D of the holes 551 may be equal to or greater than 80%, 90%, 95%, 98% of H1. If the wafer 510W is to be processed from both faces, the depth D of the (first) holes 551 may be equal to or greater than 40%, 45%, 48% of H1. The formation of the (first) holes 551 may be performed to obtain a high aspect ratio (HAR). HAR silicon etch may, e.g., be conducted using wet etching, reactive ion etching (RIE), low density plasma etching, etc.

According to FIG. 5D, the mask layer 511 may be removed after the formation of the holes 551.

In the following it is assumed for the sake of explanatory ease that the holes 551 are of the type of first holes 251 as disclosed in FIG. 2. That is, without loss of generality, it is assumed that the wafer 510W provides the semiconductor material (e.g. silicon) which acts as the battery anode semiconductor material 151. However, the following description is analogously applicable to the manufacture of the semiconductor battery 300 having first holes 351 in which the battery anode semiconductor material 151 is provided by a wall coating of the holes 551. In this case, following the manufacturing stage illustrated in FIG. 5D, first the semiconductor material layer (not shown) is deposited within the holes 551 to provide for the battery anode semiconductor material. This can be done by a silicon deposition or epitaxy process.

Referring to FIG. 5E, a layer of battery electrolyte 153 is then deposited onto the inside walls of the holes 551. The layer of battery electrolyte 153 may act as a separator between the battery anode material 151 and the battery cathode material 152 to be applied thereafter.

The layer of battery electrolyte 153 may have a thickness between 20 to 50 nm. The layer of battery electrolyte 153 may, e.g., comprise or consist of LiPON or of Thio-Liscon or any other suitable material which can be used as a battery electrolyte.

Referring to FIG. 5F, the holes 551 are then filled with the battery cathode material 152. The battery cathode material 152 may, e.g., comprise or consist of lithium cobalt (LCO) or any other suitable material. As schematically illustrated in FIG. 5F, a cavity may be left out at the top of the hole 551 in order to account for an expansion of the semiconductor material during, e.g., the recharging mode. By way of example, silicon may experience of up to 300% of expansion during recharging. The expansion is caused by intercalation, which is the reversible inclusion or insertion of a molecule or ion into a compound having a lattice structure.

According to FIG. 5G, the cavity, which has been left unfilled at the top of the hole 551, may be, e.g., partly or completely filled up with a viscose fluid or liquid 541. The viscose fluid or liquid 541 may promote mechanical stability of the structure during such expansion.

Referring to FIG. 5H, an insulating layer 561 may be applied over the first face 510Wa of the wafer 510W. The insulating layer 561 may partly or completely cover the first face 510Wa of the wafer 510W. In particular, the insulating layer 561 may cover and close the holes 551. The insulating layer 561 may, e.g., be a hard passivation layer such as, e.g., a silicon oxide layer, a silicon nitride layer or any other inorganic insulating layers. The insulating layer 561 may alternatively be an organic dielectric layer such as, e.g., a polymer layer.

FIGS. 5I and 5J relate to an example embodiment in which both sides of the wafer 510W are processed. Processing of both sides of the wafer 510W may allow for obtaining a maximum ratio of active battery volume (i.e. the accumulated hole volume) and substrate volume. Nevertheless, if only one side (e.g. the first face 510Wa) of the wafer 510W shall be used, the processes illustrated in FIGS. 5I-5J may be omitted.

More specifically, FIG. 5I illustrates flipping the wafer 510W. FIG. 5J illustrates a stage during manufacture when the processes illustrated in FIGS. 5A-H are repeated at the second face 510Wb of the wafer 510W. For means of stability a web 552 having, e.g., a thickness of a few µm may be left between the upside (second) and the downside (first)

holes 551. A thickness of the web 552 may be equal to or greater than or less than 50 µm, 40 µm, 30 µm, 20 µm, 10 µm, 5 µm.

FIG. 5K illustrates wafer dicing. During wafer dicing the substrates 110 are cut out of the wafer 510W. Wafer dicing may be performed by mechanical dicing such as, e.g., blade dicing, sawing, etc., or by laser dicing. Laser dicing allows obtaining of any desired shape of the substrates 110. By way of example, a curved or circular shape of the substrates 110 is possible. The design variability may lead to a high usage of the wafer volume and hence to a high volumetric energy density of the semiconductor battery. It is to be noted that many of the button cells have a circular shape, and thus the volume of the semiconductor battery could best be exploited by using a circular substrate. Further, laser dicing may provide for a minimum material loss of the wafer material. By way of example, stealth dicing may be used with almost no kerf loss and chipping during dicing.

The number of substrates 110 and thus the number of semiconductor batteries to be produced from one wafer 510W may depend on the desired capacity of the semiconductor battery. The smaller the number of substrates 110 cut from the wafer 510W, the higher may be the capacity of each semiconductor battery. For instance, if the dicing process of FIG. 5K is omitted, one single button cell may be produced with the size of the wafer 510W. Such semiconductor battery button cell may be termed "wafer button cell battery".

Referring to FIG. 5L, the singularized substrates 110 may then be placed in a spaced-apart relationship on a carrier 530. The carrier 530 may, e.g., be a plate or sheet of metal, e.g. a leadframe. By way of example, the carrier 530 may include or consist of metal, e.g. copper, and may have a thickness of equal to or less than or greater than 100 µm, 150 µm, 200 µm, 250 µm, 300 µm. The carrier 530 may be a permanent carrier, i.e. a carrier which will not be removed from the semiconductor battery in a later stage of the manufacturing process. In other embodiments the carrier 530 may be a temporary carrier, which may be used only for subsequent manufacturing processes such as, e.g., the encapsulation process but which will be removed later on and will not form part of the finished semiconductor battery.

The carrier 530 may have lateral dimensions D1, D2 of equal to or greater than a few tens of centimeters. By way of example, the carrier 530, as depicted in FIG. 5L, may have a lateral dimension. D1 of 30 cm and a lateral dimension D2 of 40 cm.

Referring to FIGS. 5L-M, the substrates 110 may then be placed and firmly attached to the carrier 530. If the carrier 530 is a permanent carrier (e.g. a leadframe), soldering, soft soldering, hard soldering, diffusion soldering, sintering or conductive gluing may be used. If the carrier is a temporary carrier, a sticky tape or similar attachment means may be used to temporarily fix the substrates 110 to the carrier 530.

If the carrier 530 is a permanent carrier, the carrier (e.g. leadframe) 530 may first be roughened. The substrates 110 may be covered with a very thin layer (e.g. equal to or greater than or less than 1 µm, 2 µm, 3 µm, 4 µm, 5 µm) of a backside metallization such as, e.g., AuSn. The backside metallization may then be heated and all the substrates 110 may be placed onto the rough surface of the carrier 530 and bonded thereon, see FIG. 5M showing one bonded substrate 110.

Referring to FIG. 5N, the substrates 110 may then be encapsulated by the electrically insulating encapsulant 120. According to various embodiments, the encapsulation process may be performed by lamination. During lamination one or a plurality of laminate layers 521, 522 are laminated under application of, e.g., heat and/or pressure onto the carrier 530 and the substrates 110. The laminate layer(s) 521, 522 may have cutouts (laminate layer 521) or may be continuous (laminate layer 522). Further, the uppermost laminate layer 522 may optionally be provided with a top metal layer 540. Another possibility is that the top metal layer 540 is applied onto the encapsulation body after the lamination process has been finished.

According to another possibility, a molding process is used to provide for the encapsulation body. In a molding process the carrier 530 with the substrates 110 placed thereon is inserted into a lower half of a molding tool (not shown). The molding tool is then closed by placing an upper half of the molding tool onto the lower half to form a molding cavity. The carrier 530 with the substrates 110 placed thereon is then subjected to the molding process, which comprises the injection of molding material into the molding cavity. Thereafter, the molding halves are opened and the encapsulation body, including the carrier 530 and the substrates 110 embedded in the molding material, are removed.

FIG. 5O illustrates an example process for forming the first electrical interconnect 141 between the top metal layer 540 (which will later form the cathode electrode 140) and the battery cathode material 152. For instance, holes 542 may be formed in the (first) face 520a of the encapsulation body 520. The holes 542 may be aligned with the battery cathode material 152 included in, e.g., each of the holes (not shown) in the substrate 110.

According to various embodiments, the holes 542 may be drilled into the first face 520a of the encapsulation body 520. In order to drill very precisely, the locations of the holes 542 may first be defined by photolithography. As such, a photoresist (not shown) may, e.g., be applied onto the top metal layer 540 and may be exposed by, e.g., laser direct imaging or any other suitable exposure process. The photoresist (not shown) may then be developed and partially removed. The top metal layer 540 (e.g. a copper foil) may then be etched away and the photoresist (not shown) may be completely removed. Subsequently, a laser such as, e.g., $CO_2$-laser may be used to drill through the laminate material or mold material of the encapsulation body 520. The structured top metal layer 540 may act as a mask during the laser drilling process.

Referring to FIG. 5P, the holes 542 may then be filled up with a conducting material such as, e.g., copper in order to form the first electrical interconnect, e.g. vias 141. This process may involve the preparation of the surface of the holes 542 for plating (e.g. cleaning), the deposition of a conductive layer to the side walls of the holes 542 to enable plating and the deposition of the plating material (e.g. copper) into the holes 542 to form the vias 141. While the aforementioned processes relate to galvanic plating, also other plating methods such as chemical plating (also referred to as electroless plating) may be used. In this case, instead of the deposition of a conductive layer, a seed layer for chemical plating is deposited onto side walls of the holes 542 and the plating process is performed electroless.

Referring to FIG. 5Q, both sides of the assembly (the encapsulation body 520 provided with the carrier 530 and the top metal layer 540) may be covered with a layer 570 of, e.g. nickel by, e.g. electro-plating.

Referring to FIG. 5R, the assembly or, in particular, the encapsulation body 520 may then be singularized into single semiconductor batteries 500, see FIG. 5S. Singularizing the encapsulation body 520 may be performed by cutting, etching, stamping or any other suitable process to divide the encapsulation body 520 into single pieces. The finished semiconductor batteries 500, as shown in FIG. 5S, may be directly cut out of the encapsulation body 520. According to one possibility, no further manufacturing steps are needed for providing the finished semiconductor batteries 500. The singularizing process may be performed such that semiconductor batteries (e.g. button cells) 500 of a curved or circular shape are produced. However, any other shape of the semiconductor batteries 500 is possible.

Although virtually all of the manufacturing processes up to the singularizing process may be performed on (artificial) wafer level, it is also possible that some of the final manufacturing processes are performed on single semiconductor battery level. That is, as an example, the top metal layer 540 may be, e.g., applied to single semiconductor batteries 500 rather than to the encapsulation body 520.

As apprehensible from the above, the electrically insulating encapsulant 120 of the semiconductor battery 500 is formed by singularizing the encapsulation body 520 into single batteries. Analogously, the cathode electrode 140 may be formed by singularizing the top metal layer 540 and, if present, the layer 570. Analogously, the anode electrode 130 of the semiconductor battery 500 may be formed by singularizing the carrier 530 and, if present, the layer 570.

Figure 6:
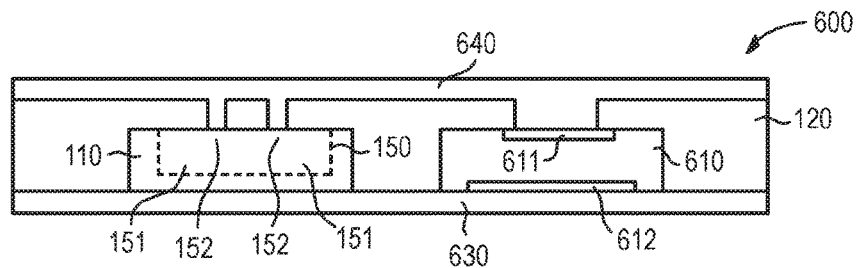
FIG. 6 is a cross-sectional view illustrating an exemplary semiconductor device or an exemplary semiconductor battery in accordance with one or more embodiments.

Referring to FIG. 6, a semiconductor device 600 includes a substrate 110, an electronic component 610 and an electrically insulating encapsulant 120. The electrically insulating encapsulant 120 at least partly embeds the substrate 110 and at least partly embeds the electronic component 610.

The substrate 110 may be designed in accordance with any embodiment disclosed above. In particular, the substrate 110 may include or consist of a semiconductor material or an insulating material. The substrate 110 includes a semiconductor battery structure 150 as described above.

The electronic component 610 may be an integrated circuit, e.g. a semiconductor chip in which an integrated circuit monolithically formed. The electronic component 610 may be a logic integrated circuit, a micro-controller, a sensor, etc. In particular, the electronic component 610 may be temperature sensor, a magnetic field sensor, an electric field sensor or an acceleration sensor.

The electronic component 610 may be configured as an active device or a passive device if configured as a passive device, the electronic component 610 may be a PID (passive integrated device) in which one or more passives (resistance, inductance, capacitor, or combinations thereof) are formed in a monolithic semiconductor chip.

The semiconductor device 600 may be provided with external terminals 630, 640. The external terminal 640 may be electrically connected to the battery cathode material comprised in the semiconductor battery structure 150. The external terminal 630 may be electrically connected to the battery anode semiconductor material 151 comprised in the semiconductor battery structure 150.

Further, the external terminal 640 may be electrically connected to a first contact pad 611 of the electronic component 610. The external terminal 630 may be electrically connected to a second contacts pad 612 of the electronic component 610. The first and second contact pads 611, 612 may be power supply pads of the electronic component 610.

According to various embodiments, the semiconductor device 600 may be a "smart" semiconductor battery, i.e. a semiconductor battery which is equipped with a functionality which is in addition to the basic battery function provided by the substrate 110. The additional function may be provided by the electronic component 610. The additional function may, e.g., be one or more of a group of functions consisting of: voltage measurement, temperature measurement, providing a capacitance/resistance/inductance between the first and second contact pads 611, 612, controlling a charging and/or discharging process, sensing an external quantity such as, e.g. a magnetic field, an electric field, an acceleration, etc. However, it is also possible that the semiconductor device 600 is not a button cell battery, i.e. that the external terminals 630, 640 are not designed as button cell battery electrodes.

The electronic component 610 may further be equipped with means for communicating with external applications. For example, the electronic component 610 may be equipped with an NFC (near field communication) circuitry. The NFC circuitry may be energized by the semiconductor battery structure 150 of the substrate 110 and may be configured to report, e.g., measurement values, sensing results, quantities related to the charging status of the semiconductor battery structure 150, etc. to an external application. The NFC may be implemented in the electronic component 610 (or in a second electronic component not shown in FIG. 6).

According to various embodiments, the semiconductor device 600 is a button cell battery. The external terminal 630 may then form the anode electrode 130 of such "smart" button cell battery and the external terminal 640 may form the cathode electrode 140 of such "smart" button cell battery.

In view of the features and characteristics in relation to the substrate 110, encapsulant 120, semiconductor battery structure 150, anode electrode 130, cathode electrode 140, reference is made to the disclosure above in order to avoid reiteration. Further, reference is made to the disclosure above in view of the example process of FIGS. 5A-5S manufacture the semiconductor device 600. The process described above may merely be modified by a step of additionally placing electronic components 610 in a spaced-apart relationship next to substrates 110, see FIG. 5L. Apart from that all the various embodiments of manufacturing a semiconductor battery 100, 200, 300 are analogously applicable for manufacturing the semiconductor device 600.

Figure 7:
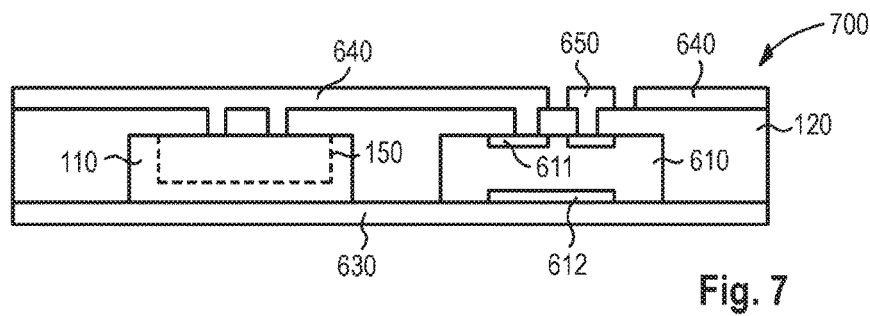
FIG. 7 is a cross-sectional view illustrating an exemplary semiconductor device or an exemplary semiconductor battery in accordance with one or more embodiments.

Referring to FIG. 7, a semiconductor device 700 is disclosed. Semiconductor device 700 may be similar to semiconductor device 600 with the exception that at least one additional external terminal 650 is provided. External terminal 650 may be electrically connected to electronic component 610. External terminal 650 may provide for an I/O port to the electronic component 610. It is to be noted that semiconductor device 700 does not necessarily need to form a button cell battery. It may also be possible that the substrate 110 merely acts an internal battery or power source for energizing the electronic component 610 without providing the possibility of energizing external devices. In this case, no anode electrode 130 (or external terminal 630) and/or no cathode electrode 140 (or external terminal 640) needs to be accessible for external devices. Rather, it is possible that these structures are replaced by internal wirings which are embedded in the encapsulant 120 and which may be partly or completely covered by the encapsulant 120. The communication with external applications may either be conducted via I/O port(s) 650 or, e.g., by radio communication. (e.g. NFC) as described above.

Figure 8:
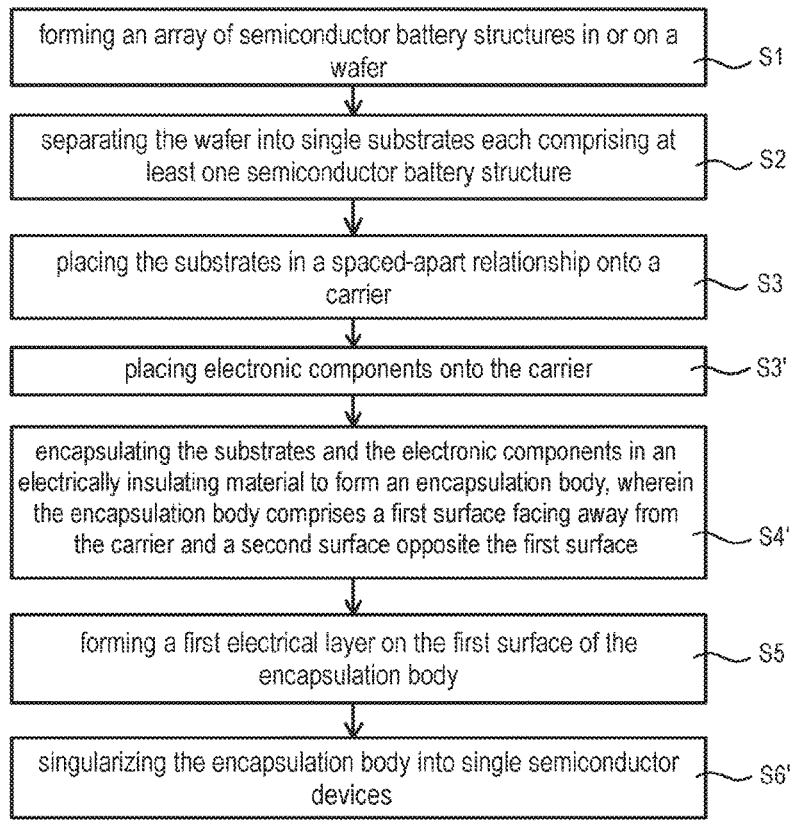
FIG. 8 is a flow-chart of an exemplary method of manufacturing a semiconductor device including a semiconductor battery structure in accordance with one or more embodiments.

FIG. 8 illustrates a flow-chart of an exemplary method of manufacturing a semiconductor device 600, 700 including a semiconductor battery structure 150 in accordance with various embodiments. At S1 an array of semiconductor battery structures 150 is formed in or on a wafer. Generally, forming an array of semiconductor battery structures in or on a wafer may include generating a plurality of first arrays of first holes in a first surface of the wafer, wherein the inner walls of the first holes comprise an battery anode semiconductor material; introducing a battery electrolyte material into the first holes; and forming a battery cathode material over the battery electrolyte material. The forming of an array of battery semiconductor structures in or on a wafer may optionally further include generating a plurality of second arrays of second holes in a second surface of the wafer opposite the first surface of the wafer, wherein the inner walls of the second holes comprise the battery anode semiconductor material; introducing the battery electrolyte material into the second holes; and forming a battery cathode material over the battery electrolyte material. FIGS. 5A-5J illustrate various embodiments for forming such semiconductor battery structures 150.

At S2 the wafer is separated into single substrates 110 each comprising at least one semiconductor battery structure 150. FIG. 5K provides an example of this process.

At S3 the substrates 110 are placed in a spaced-apart relationship onto a carrier. FIGS. 5L,-5M may exemplarily illustrate this process.

At S3' electronic components 610 are placed onto the carrier. Each electronic component 610 may be placed next to one substrate 110. Thus, an array of pairs of substrates 110 and electronic components 610 may be assembled. Without saying it is also possible to place a plurality of electronic components 610, which might be different, next to one substrate 110. In this case, semiconductor devices 600, 700 including one substrate 110 and a plurality of, e.g., different electronic components 610 may be manufactured.

At S4' the substrates 110 and the electronic components 610 are encapsulated in an electrically insulating material to form an encapsulation body 520. Encapsulating the substrates 110 and electronic components in an electrically insulating material may include at least one of molding or laminating. Examples of these processes are demonstrated by FIG. 5N.

At S5 a first electrical layer is formed on a first surface of the encapsulation body 520. This process may include forming a first electrical interconnect on the first surface of the encapsulation body by applying a first metallization layer on the first surface of the encapsulation body; and generating a plurality of vias in the first surface of the encapsulation body configured to electrically connect the first metallization layer with the semiconductor battery structures. This process may, e.g., be carried out in line with description to FIGS. 5N-5Q.

At S6' the encapsulation body 520 is singularized into single semiconductor devices 600, 700 each including at least one substrate and one electronic component. This process has been exemplified by FIGS. 5R-5S and the corresponding description.

Figure 9:
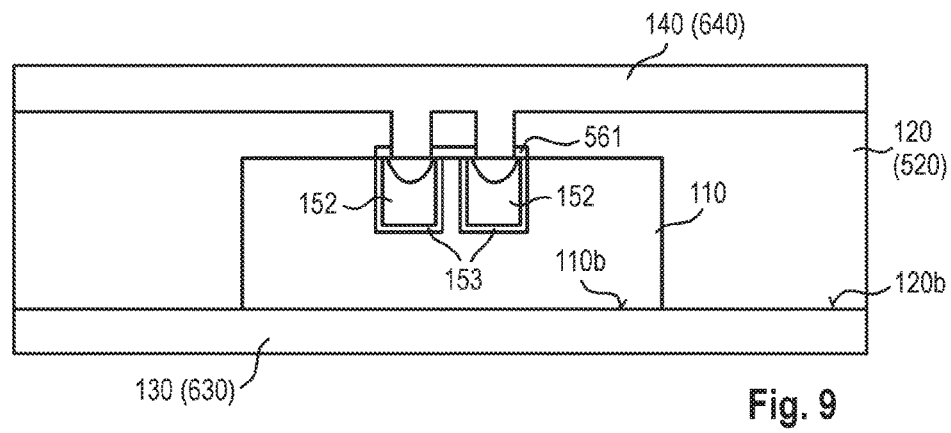
FIG. 9 is a cross-sectional view illustrating an exemplary semiconductor device or an exemplary semiconductor battery in accordance with one or more embodiments.
Figure 10:
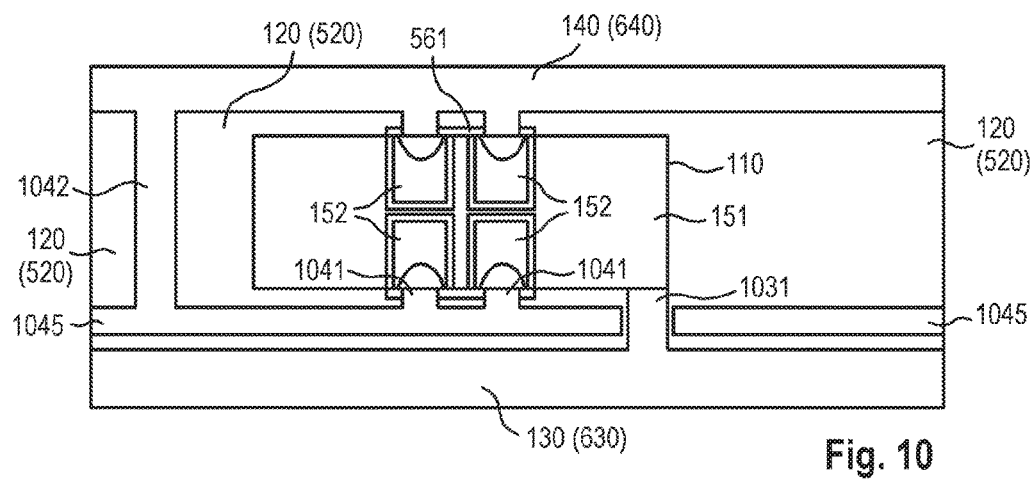
FIG. 10 is a cross-sectional view illustrating an exemplary semiconductor device or an exemplary semiconductor battery in accordance with one or more embodiments.
Figure 11:
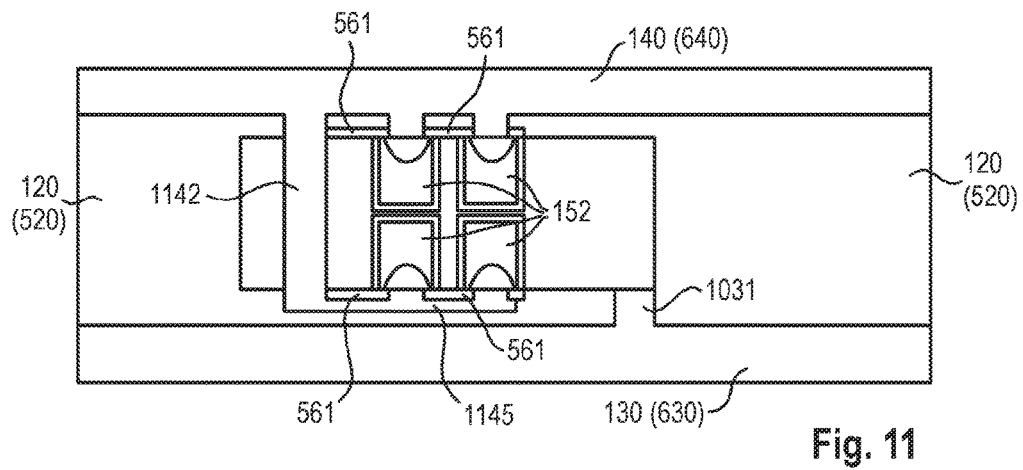
FIG. 11 is a cross-sectional view illustrating an exemplary semiconductor device or an exemplary semiconductor battery in accordance with one or more embodiments.

FIGS. 9-11 are cross-sectional view illustrating examples of wirings in semiconductor devices (e.g. 600, 700) or semiconductor batteries (eg. 100, 200, 300, 500) in accordance with various embodiments.

FIG. 9 illustrates an example of electrically connecting the substrate 110 to the anode electrode 130 (or external terminal 630) and to the cathode electrode 140 (or external terminal 640). As previously described, the substrate 110 may be directly attached (e.g. soldered or glued by a conducting adhesive) to the anode electrode 130 (or external terminal 630). The anode electrode 130 (or external terminal 630) may be cut out of a carrier 530 (e.g. leadframe) or may be applied as a metallization to the second face 120b of the encapsulant 120 and the second face 110b of the substrate 110. Further, if the structure shown in FIG. 9 is part of a semiconductor device such as, e.g. semiconductor devices 600, 700, the external terminal 630 may be part of a redistribution layer (RDL). A redistribution layer may include one or more metallization layers and one or more insulating layers (not shown) sandwiched between the metallization layers. The RDL may be completely fabricated by thin film processes on a wafer level. In this case, a temporary carrier 530 is used during manufacturing (see FIGS. 5L-5O) and is removed after the encapsulation body 520 and, e.g., the external terminal 540 has been produced. The RDL is then applied on (artificial) wafer level to the bottom face of the encapsulation body 520 which (at this time) comprises the exposed second faces 110b of the substrates (and the exposed bottom faces of the electronic components 610 including, e.g., second contact pads 612) and the second faces 120b of the encapsulants 120 which (at this stage of the proceeding) are still integrated in the (artificial) wafer formed by the encapsulation body 520.

Similarly, the cathode electrode 140 (or external terminal 640) may be replaced by a RDL in case a semiconductor device such as, e.g. semiconductor device 600 or 700 is considered.

FIG. 10 illustrates an example of electrically connecting a substrate 110 as illustrated, e.g., in FIG. 5J to the anode electrode 130 (or external terminal 630) and to the cathode electrode 140 (or external terminal 640) of the semiconductor battery or semiconductor device. The anode electrode 130 (or external terminal 630) may be connected to the battery anode semiconductor material 151 (e.g. to bulk substrate 110, see FIG. 2) or to a semiconductor layer (see FIG. 3) by a second electrical interconnect which is, in this example, realized by vias 1031. The battery cathode material 152 of the battery elements facing down towards the anode electrode 130 (or external terminal 630) is electrically connected to a metallization layer 1045 by vias 1041. The metallization layer 1045, which may be part of a laminate layer of the encapsulation body 520, may be electrically connected to the cathode electrode 140 (or external terminal 640) by a feed-through 1042. The feed-through 1042 may be arranged to pass through the encapsulant 120 (or encapsulation body 520). The metallization layer 1045, the feed-through 1042 and the vias 1041 may form part of the first electrical interconnect which is used to wire the battery cathode material to the cathode electrode 140 (or external terminal 640) of the semiconductor battery or semiconductor device. The feed-through 1042 as well as all other parts of the electrical interconnect and anode electrodes 130, cathode electrodes 140 or external terminal 630, 640 may be produced on (artificial) wafer level, i.e. before the cutting step illustrated, e.g., in FIG. 5R.

FIG. 11 is a sectional view illustrating an example of electrical connections to the substrate 110 similar to the example illustrated in FIG. 10. As a difference to the example of FIG. 10, the feed-through 1042 running through the encapsulant 120 is omitted and replaced by a feed-through 1142 running through the substrate 110. The feed-through 1142 may be designed as a TSV (through silicon via). The metallization layer 1045 may be omitted and replaced by, e.g., a substrate metallization 1145 extending above, e.g., the insulating layer 561.

In other words, if battery elements are arranged on both sides of the substrate 110, a feed-through for electrically connecting the battery cathode material 152 of the face-down battery elements of the semiconductor battery structure may either pass through the encapsulant 120 (see feed-through 1042) or through the substrate 110 (see feed-through 1142).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor battery, comprising:
   a substrate;
   a battery anode semiconductor material in or over the substrate;
   a battery cathode material in or over the substrate;
   a battery electrolyte disposed between the battery anode semiconductor material and the battery cathode material;
   an electrically insulating encapsulant having a first face and a second face, wherein the substrate is at least partly embedded in the encapsulant;
   an anode electrode disposed over the second face of the encapsulant, wherein the anode electrode is electrically connected to the battery anode semiconductor material; and
   a cathode electrode disposed over the first face of the encapsulant, wherein the cathode electrode is electrically connected to the battery cathode material.

2. The semiconductor battery of claim 1, wherein the battery anode semiconductor material is formed by the substrate.

3. The semiconductor battery of claim 1, wherein the battery anode semiconductor material comprises silicon.

4. The semiconductor battery of claim 1, wherein the first face of the encapsulant is opposite the second face of the encapsulant.

5. The semiconductor battery of claim 1, wherein a second face of the substrate levels with the second face of the encapsulant, and wherein the anode electrode is further disposed over the second face of the substrate.

6. The semiconductor battery of claim 1, wherein the substrate comprises a first face and a second face opposite the first face, wherein the first face of the substrate is provided with a first array of first holes, and wherein each first hole accommodates at least a part of the battery cathode material and at least a part of the battery electrolyte.

7. The semiconductor battery of claim 6, further comprising:
   a first electrical interconnect configured to electrically connect the battery cathode material comprised in each of the first holes to the cathode electrode.

8. The semiconductor battery of claim 6, wherein the second face of the substrate is provided with an array of second holes, and wherein each second hole accommodates at least a part of the battery cathode material and at least a part of the battery electrolyte.

9. The semiconductor battery of claim 8, wherein the first electrical interconnect is further configured to electrically connect the battery cathode material comprised in each of the second holes to the cathode electrode.

10. The semiconductor battery of claim 1, further comprising:
    a second electrical interconnect configured to electrically connect the battery anode semiconductor material to the anode electrode.

11. The semiconductor battery of claim 1, wherein the encapsulant completely covers side faces of the substrate.

12. The semiconductor battery of claim 1, wherein the substrate comprises a first face and a second face opposite the first face, and wherein the encapsulant completely covers one or both of the first face of the substrate and the second face of the substrate except for vias provided in at least one of the first face and the second face of the encapsulant.

13. A semiconductor battery wafer, comprising:
    a semiconductor wafer having a first face and a second face opposite the first face;
    an array of first holes arranged in the first face of the semiconductor wafer, each first hole accommodating at least a part of a battery cathode material and at least a part of a battery electrolyte; and
    an array of second holes arranged in the second face of the semiconductor wafer, each second hole accommodating at least a part of the battery cathode material and at least a part of the battery electrolyte.

* * * * *